United States Patent [19]
von Kaler

[11] Patent Number: 5,094,121
[45] Date of Patent: Mar. 10, 1992

[54] SHIFTING MECHANISM DETENT ARRANGEMENT

[75] Inventor: Roland L. von Kaler, Tecumseh, Mich.

[73] Assignee: Tecumseh Products Company, Tecumseh, Mich.

[21] Appl. No.: 738,825

[22] Filed: Aug. 1, 1991

[51] Int. Cl.⁵ .............................................. B60K 20/00
[52] U.S. Cl. ...................................... 74/475; 74/335; 74/371
[58] Field of Search ..................... 74/473 R, 475, 335, 74/371, 372

[56] References Cited

U.S. PATENT DOCUMENTS

| | | | |
|---|---|---|---|
| Re. 32,125 | 4/1986 | Von Kaler et al. | 74/371 |
| 734,837 | 7/1903 | Edgar . | |
| 3,049,022 | 8/1962 | Love | 74/475 |
| 3,812,735 | 5/1974 | von Kaler et al. | 74/371 |
| 4,070,914 | 1/1978 | Reinhardt et al. | 74/475 |
| 4,531,423 | 7/1985 | Fogelberg | 74/475 |
| 4,656,886 | 4/1987 | Edwards | 74/371 |
| 4,690,011 | 9/1987 | Sakai et al. | 74/475 |
| 4,704,917 | 11/1987 | Hiroyasu | 74/475 |
| 4,714,128 | 12/1987 | Yoshinaka et al. | 74/475 X |
| 4,809,560 | 3/1989 | Nemoto | 74/371 |
| 4,827,783 | 5/1989 | Yamaoka et al. | 74/371 |
| 4,841,794 | 7/1989 | Hikishima | 74/371 |
| 4,966,574 | 10/1990 | von Kaler et al. | 74/371 |
| 5,016,488 | 5/1991 | Goates | 74/475 |

FOREIGN PATENT DOCUMENTS 193255 1/1957 Austria .
817651 8/1959 United Kingdom .

*Primary Examiner*—Dwight Diehl
*Attorney, Agent, or Firm*—Baker & Daniels

[57] ABSTRACT

The present invention is a small transmission for riding lawn mowers and the like. The transmission includes a detent arrangement which aids the operator while shifting the transmission gears. The detent arrangement includes detent recesses which are formed in the casting of the housing, and a biased detent mechanism mounted on the shift fork of the transmission. The biased detent mechanism includes a projection on the shift fork which receives a spring and nose cone. The spring urges the nose into the detent recesses so that the shifting mechanism holds the transmission in the selected gear, and provides a positive feel of the changing gears. Alternatively, a spring biased ball may be mounted on the shift fork to engage the detent recesses.

13 Claims, 4 Drawing Sheets

SHIFTING MECHANISM DETENT ARRANGEMENT

BACKGROUND OF THE INVENTION

1. Field of the Invention.

The present invention relates to transmission shifting mechanisms for small transmissions such as used in riding lawn mowers and the like. More specifically, the field of the invention is that of small transmissions having a detent arrangement for biasing the shifting mechanism.

2. Prior Art.

One transmission having an in-line shifting mechanism is disclosed in U.S. Pat. No. 4,966,574, assigned to the assignee of the present invention, the disclosure of which is explicitly incorporated by reference. In this arrangement, the input shaft turns a bevel gear which is freely rotatable on the shift shaft. The bevel gear engages a spur gear on the counter shaft. The other counter shaft spur gears engage speed change spur gears which are freely rotatable on the shift shaft. The shift fork of the shifting mechanism moves the keys and thereby engages one of the speed change spur gears on the shift shaft, with the keys being rotatably fixed to the shift shaft to couple the counter shaft and the shift shaft. Another gear on the shift shaft engages the ring gear of the differential to transfer the rotational motion of the shift shaft to the output shafts, which are driven by a speed determined according to the gear ratio.

Such a transmission may include a shift arm biasing mechanism like that disclosed in U.S. Pat. No. RE32,125, assigned to the assignee of the present invention, the disclosure of which is explicitly incorporated by reference. In the disclosed arrangement, the shift fork of the shifting mechanism includes a detent plate with a peripheral edge having a series of detent seats. The detent seats have also been provided in the side of the detent plate. A spring and ball are disposed in the housing of the transmission, positioned to be adjacent to the detent seats and arranged so that the ball is biased by the spring into one of the detent seats. The shift arm is connected to a manually operable control and provides sufficient "feel" so that the vehicle operator positively senses the shift positions.

In order to provide the detent arrangement of the above mentioned U.S. Pat. No. RE32,125, a separate detent plate is secured to the shift fork by welding, brazing, or similar method. The detent plate must have detent seats formed at predetermined positions, and must be large enough to provide detent seats for all the selectable gears. The biasing mechanism is provided by forming an aperture in the housing, and assembling the mechanism so that the spring biased ball engages the detent seats. Providing such a detent plate and biasing mechanism adds to the expense of the transmission, both in terms of additional materials and manufacturing steps. The additional materials includes the detent plate itself and the biasing mechanism. The additional manufacturing steps include forming the detent seats in each detent plate, and assembling the biasing mechanism in the housing aperture.

What is needed is a shifting mechanism detent arrangement which eliminates some of the conventional components and thereby lowers the cost.

Another need is for a shifting mechanism which requires fewer manufacturing steps.

Also needed is such a shifting mechanism which provides sufficient "feel" for positively sensing the shift position.

SUMMARY OF THE INVENTION

The present invention is an in-line shift transmission having an improved detent arrangement. One half of the transmission housing includes a series of detent recesses located in a wall facing the shift fork. The shift fork includes a spring biased nose which extends and engages one of the detent recesses.

Material and manufacturing costs are significantly reduced by the arrangement of the present invention. In the present invention, the detent recesses are conveniently formed in a wall of the housing and the biased detent mechanism is simply placed over a mounting portion of the shift fork. Modifying the casting of the housing is a relatively inexpensive operation and only needs to be performed once, with all subsequent castings from the same mold having the detent recesses. Further, adding the mounting portion to the shift fork requires only a minor adjustment in the design and manufacture of the shift fork. In comparison, prior art shifting mechanisms include a detent plate which requires additional manufacturing to form the detent holes or recesses. Also, the preformed detent plate of the prior art must be attached to the shift fork by a further manufacturing step. Then, the prior art biasing mechanism requires that an aperture be formed in the housing and that the biasing mechanism be assembled inside that aperture. The structure of the present invention eliminates parts and reduces manufacturing steps.

The present invention, in one form, is a transmission comprising a housing, a plurality of shafts, and a shifting mechanism. The shafts are rotatably disposed within the housing, and include a shift shaft on which a plurality of gears is rotatably disposed. The shifting mechanism is operably coupled to the shift shaft for selectively engaging the gears. The shifting mechanism may be moved to a plurality of shifting positions to lock a selected said gear to the shift shaft. The housing includes a plurality of internal detent recesses corresponding respectively to the shift positions of the shifting mechanism. The shifting mechanism includes an additional mechanism which engages the internal detent recesses of the housing to hold the shifting mechanism in a selected position.

One object of the present invention is to provide a shifting mechanism detent arrangement which eliminates some of the conventional components and thereby lowers the cost.

Another object is to provide a shifting mechanism which requires fewer manufacturing steps.

Also an object is to provide such a shifting mechanism which provides sufficient "feel" for positively sensing the shift position.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplifications are not to be construed as limiting the scope of the invention in any manner.

DESCRIPTION OF THE PREFERRED EMBODIMENT

Figure 1:
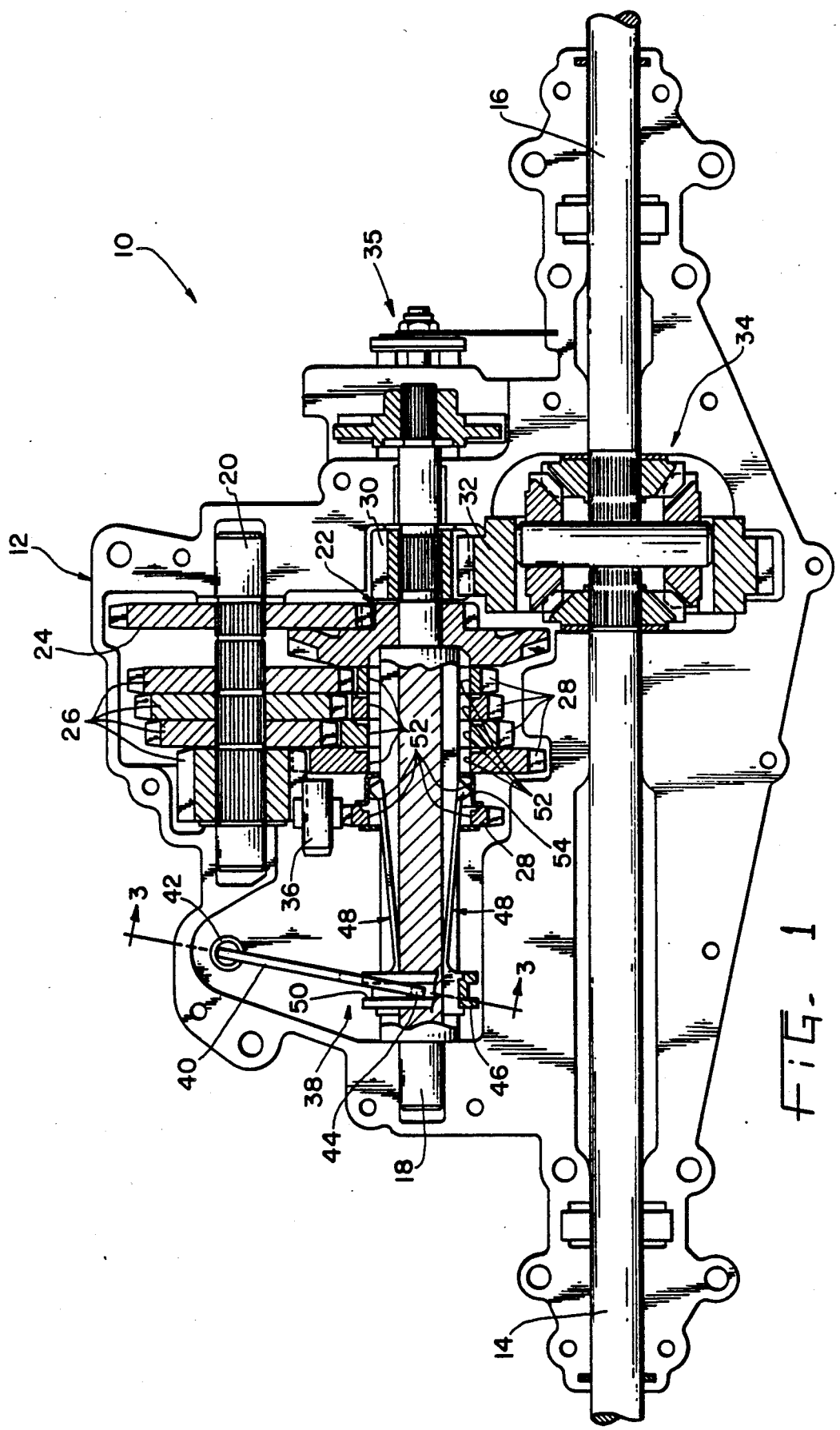
FIG. 1 is a center sectional view of a transaxle having an in-line shift transmission.

The present invention relates to in-line shift transmission 10 as shown in FIG. 1. Lower housing 12 together with an upper housing 13 (shown in FIGS. 2-4 and 9) rotatably supports axles 14 and 16, shift shaft 18, and counter shaft 20. An input shaft (not shown) turns input bevel gear 22 which is freely rotatable about shift shaft 18 and engaged with gear 24 of counter shaft 20. Companion gears 26 of counter shaft 20 engage spur gears 28 of shift shaft 18 so that gear 30 of shift shaft 18 drives ring gear 32 of differential 34 and thereby turns axles 14 and 16 in a forward direction. In addition, transmission 10 may be slowed or stopped by operation of brake assembly 35. A reverse gear may be provided by stub shaft and gear 36 being disposed between one of companion gears 26 and one of spur gears 28.

The gear ratio of transmission 10 is determined by shifting mechanism 38 which includes shift fork 40 rotatably disposed in bushing 42, finger 44 engaging collar 46 which is disposed about shift shaft 18, and keys 48. Shift fork 40 is connected in a known manner to linkage (not shown) of the vehicle which allows the vehicle operator to change gears manually. Shift fork 40 is supported in upper and lower housings 12 and 13, respectively, and includes finger 44 which extends into annular groove 50 of collar 46. Collar 46 which is located on shift shaft 18 and operably engages keys 48. Keys 48 are disposed within shift shaft 18 and selectively engage gear keyways 52 which are internal recesses in spur gears 28 which may be engaged by keys 48 to provide forward and reverse gear ratios. Neutral sleeve 54 provides an axial position within shift shaft 18 wherein keys 48 do not engage any keyway 52. Alternatively, neutral sleeve 54 may include an internal recess to provide an engagable neutral position.

Figure 2:
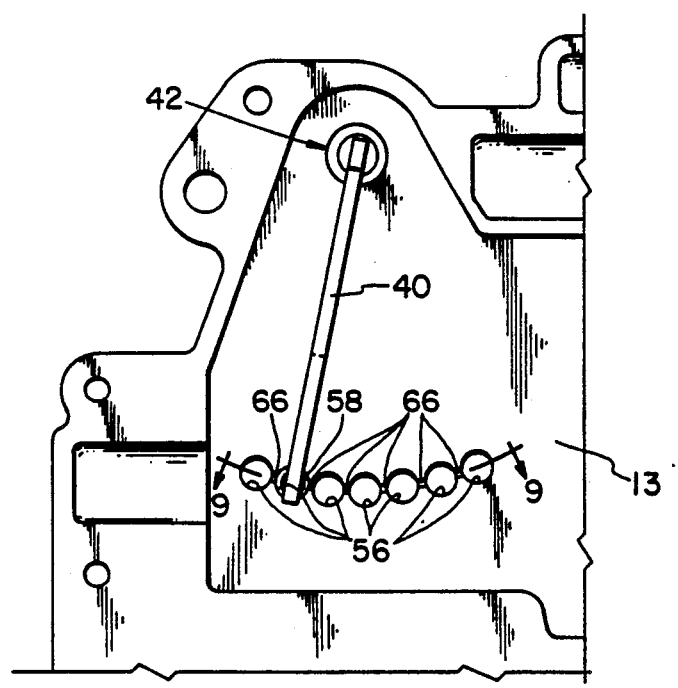
FIG. 2 is a plan view of the upper housing with the shift fork and detent arrangement of the present invention.
Figure 3:
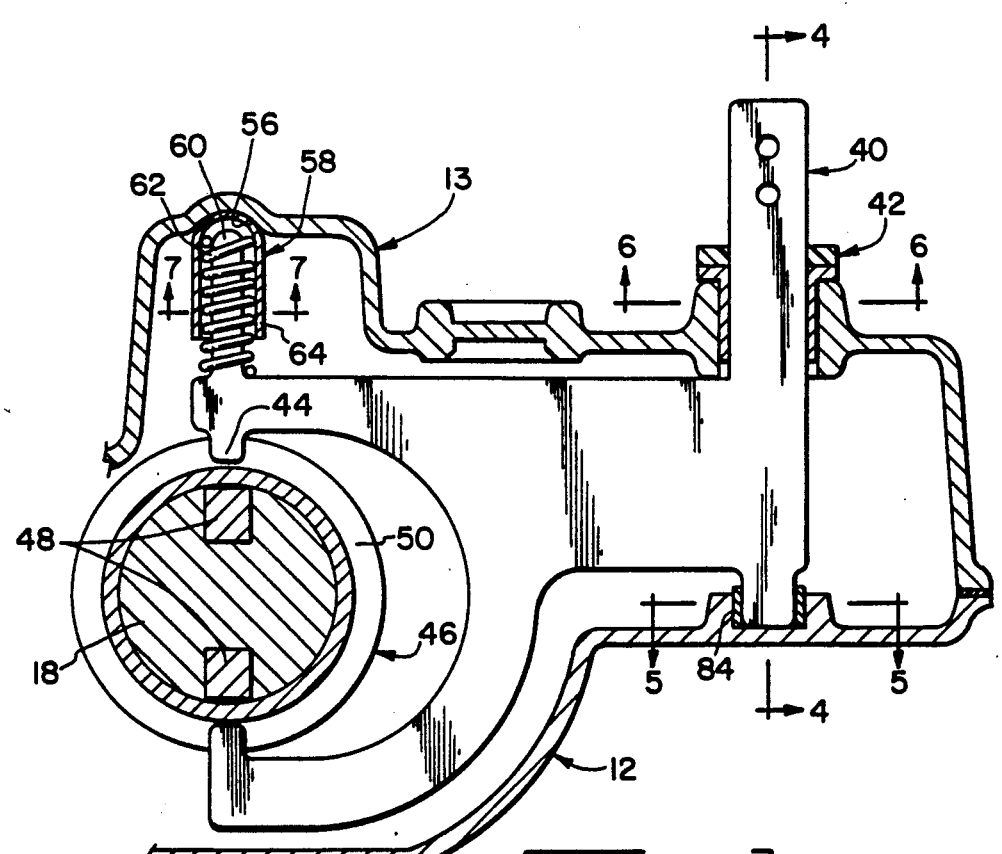
FIG. 3 is an elevational view of the shifting mechanism, in partial cross-section taken along view line 3—3 of FIG. 1.
Figure 9:
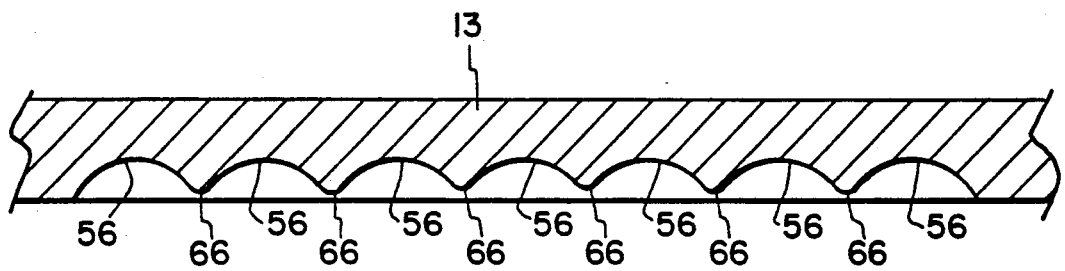
FIG. 9 is a cross-sectional view of the detent recesses, taken along arched view line 9—9 of FIG. 2.

In accordance with the present invention, shifting mechanism 38 includes detent recesses 56 formed in upper housing 13 and biased detent mechanism 58 disposed on shift fork 40 as shown in FIGS. 2, 3, and 9. Shift fork 40 includes projection 60 which serves as a mounting portion for spring 62 and nose 64 to form biased detent mechanism 58. Spring 62 urges nose 64 upwardly into detent recess 56, with both the top outer surface of nose 64 and the bottom inner surface of recess 56 being generally semi-spherically shaped. Recesses 56 are arranged in an arc on upper housing 13 to match the arc of motion of biased detent mechanism 58 (FIG. 2). Grooves 66 may also be formed in upper housing 13 to connect recesses 56 and thereby guide nose 64 between engagement with recesses 56.

Figure 8:
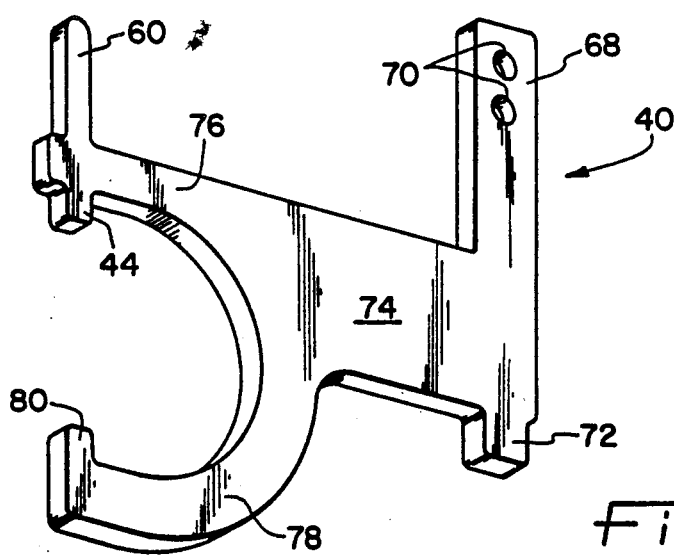
FIG. 8 is a perspective view of the shift fork.

Shift fork 40 is preferably made of plate material and formed as a flat stamping as shown in FIG. 8. Upper portion 68 of shift fork 40 extends beyond upper housing 13 and includes holes 70 which may be connected to shift linkage ultimately controlled by a manually operated gear shift lever (not shown). Disposed on the opposite end from upper portion 68, stub 72 extends below shift fork body 74 to support shift fork 40 pivotally. Upper arm 76 projects away from body 74 to engage collar 46 with downwardly extending finger 44, and arm 76 mounts biased detent mechanism 58 on projection 60. Lower arm 78 projects away from body 74 and engages collar 46 with upwardly extending finger 80.

Figure 4:
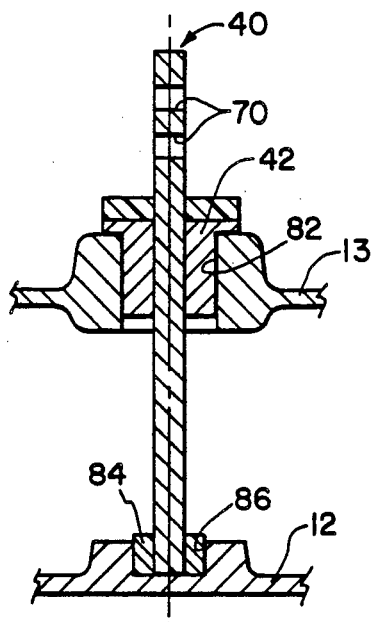
FIG. 4 is a sectional view of the seating of the shift fork in the housing, taken along view line 4—4 of FIG. 3
Figure 5:
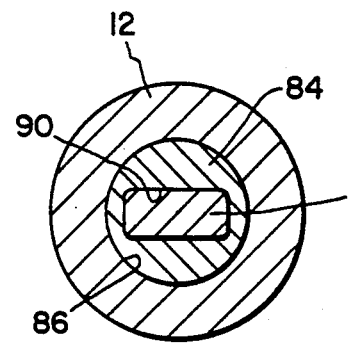
FIG. 5 is a sectional view of the shift fork and lower bushing, taken along view line 5—5 of FIG. 3.
Figure 7:
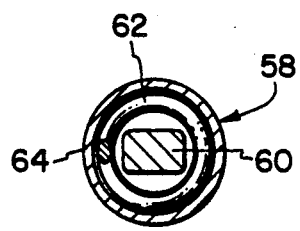
FIG. 7 is a sectional view of the detent, taken along view line 7—7 of FIG. 3.
Figure 6:
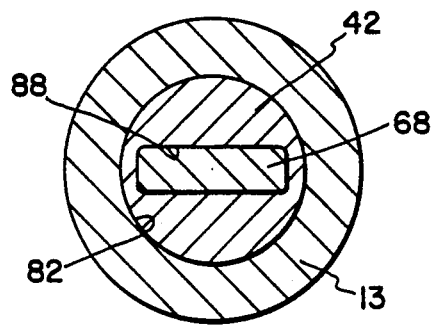
FIG. 6 is a sectional view of the shift fork and upper bushing, taken along view line 6—6 of FIG. 3.

To aid in rotatably supporting shift fork 40 in housings 12 and 13, bushing 42 is disposed in opening 82 of upper housing 13 and bushing 84 is disposed in indentation 86 of lower housing 12 as shown in FIGS. 4-6. Bushing 42 is generally circular and includes slot 88 which is shaped to receive upper portion 68 so that shift fork 40 may freely rotate in opening 82. Bushing 84 is also generally circular and includes slot 90 which is shaped to receive stub 72 so that shift fork 40 may freely rotate in opening 82.

Both bushing 42 and 84 are preferably made of nylon. Also, nose cone 64 is preferably made of steel or nylon. The biasing force of spring 62 is designed to allow manual operation of the shifting mechanism, the actual spring value being determined by the mechanical resistance of the shifting mechanism and the leverage of the linkage. The portion of upper housing 13 which includes recesses 46 may be made of conventional material for transmission housings. Shift fork 40 is preferably made from sheet metal having a thickness of about 0.187 inches.

Figure 11:
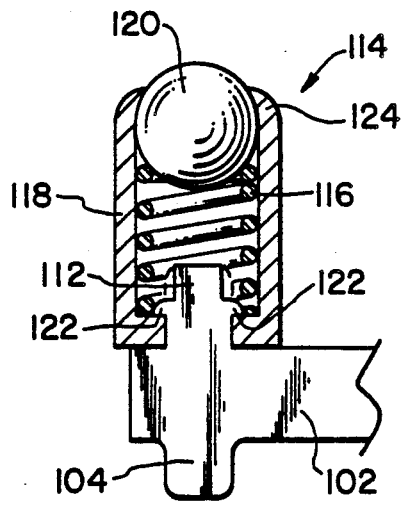
FIG. 11 is a cross-sectional view of the detent mechanism taken along view line 11—11 of FIG. 10.
Figure 10:
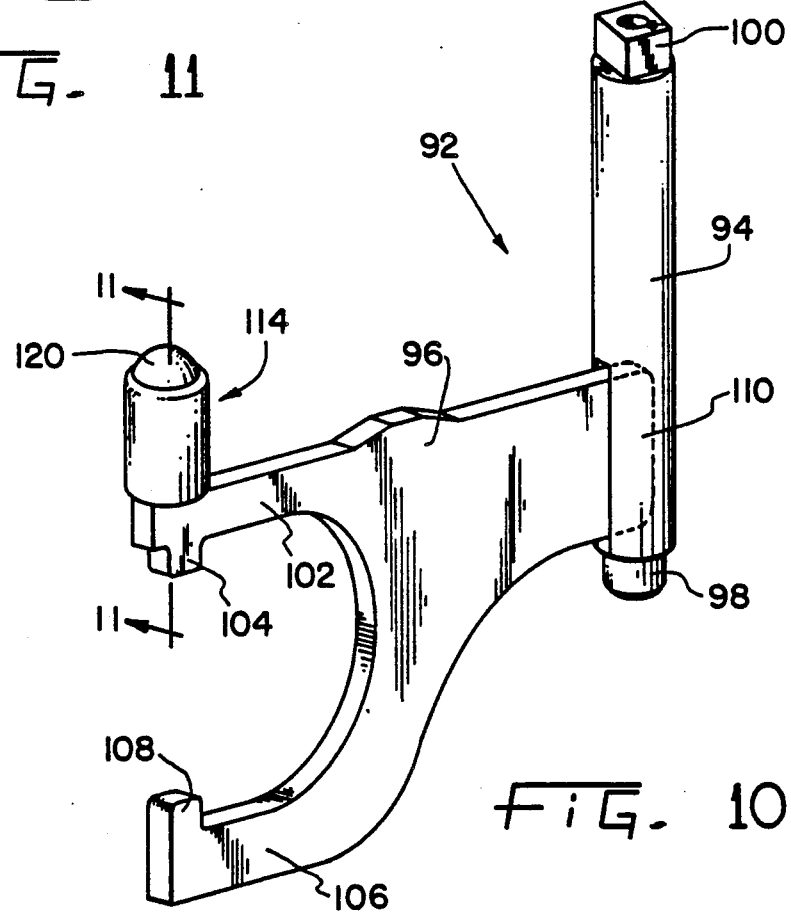
FIG. 10 is a perspective view of an alternative embodiment of the shift fork.

An alternative embodiment of the shift fork is shown in FIGS. 10 and 11. Referring to FIG. 10, shift fork 92 includes a rod portion 94 and a body portion 96 which are connected by brazing or other suitable method. Rod portion 94 is cylindrical and includes ends 98 and 100 which are received in indentation 86 and opening 82, respectively. Body portion 96 includes upper arm 102 having finger 104, lower arm 106 having finger 108, and attachment portion 110 which is received in a recess in rod portion 94. Body portion 96 is preferably formed by flat stamping. Protruding upwardly from upper arm 102 is stud 112 for mounting detent mechanism 114, see FIG. 11.

Detent mechanism 114 includes spring 116 disposed within cup-shaped housing 118 and engaging ball 120 which is located within housing 118 and extends beyond its top to engage detent recesses 56. Housing 118 is mounted to upper arm 102 by stud 112 which is peened or otherwise deformed to displace material 122 from stud 112 around housing 118 and trap its cup-shaped body. Further, top 124 of housing 118 is crimped to retain ball 120 within housing 118, although a portion of ball 120 extends beyond top 124. With this structure, ball 120 is urged upwards by spring 116 while still being retained in housing 118 so that detent mechanism 114 may be conveniently assembled. Further, in operation of the shifting mechanism, ball 120 may engage and be shifted between engagements with various detent recesses 56 because of the space available within housing 118. The engagement between ball 120 and detent recesses 56 provides a positive feel of changing gears.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A transmission comprising:
    a housing;
    a plurality of shafts rotatably disposed within said housing, one of said shafts being a shift shaft having a plurality of gears rotatably disposed thereon; and
    shifting means operably coupled to said shift shaft for selectively engaging said gears to lock a selected said gear to said shift shaft, said shifting means movable to a plurality of shift positions;
    said housing including a plurality of internal detent recesses corresponding respectively to said shift positions of said shifting means, and said shifting means including means for engaging said internal detent recesses of said housing to hold said shifting means in a selected one of said shift positions.

2. The transmission of claim 1 wherein said shifting means includes a collar disposed on said shift shaft, a shift fork rotatably disposed within said housing and engaging said collar, and a key disposed within said shift shaft and connected to said collar, said key adapted to engage said gears whereby after said collar is moved to one of said shift positions then said key engages a corresponding one of said gears and said shift shaft rotates according to said engaged gear.

3. The transmission of claim 2 wherein said engaging means includes a spring biased nose mounted on said shift fork and adapted to extend into one of said detent recesses of said housing.

4. The transmission of claim 2 wherein said engaging means includes a spring biased ball disposed in a housing mounted on said shift fork, said ball adapted to extend into one of said detent recesses of said housing.

5. The transmission of claim 2 wherein said shift fork includes a mounting portion extending towards said detent recesses, and said engaging means comprises a spring mounted on said mounting portion with a nose disposed over said spring, said nose urged by said spring to extend into one of said detent recesses of said housing.

6. The transmission of claim 5 wherein said detent recesses are generally semi-spherically shaped and said nose has a generally semi-spherically shaped end.

7. The transmission of claim 6 wherein said housing further includes a plurality of internal grooves connecting said detent recesses, said detent recesses are arranged along an arc line, and said grooves are also disposed along the arc line, whereby said nose is guided between said detent recesses by said grooves during movement of said shift fork.

8. The transmission of claim 2 wherein said shift fork is generally comprised of plate material and is supported in said housing by first and second bushings, each said bushing including a generally cylindrical body with a generally rectangular slot for receiving and pivotally supporting said shift fork.

9. The transmission of claim 2 wherein said shift fork includes an upper and lower arm each having a finger, said collar includes a groove, and said fingers engage said groove on opposite sides of said collar 10. The transmission of claim 2 wherein said shift fork includes a rod portion and a body portion, said rod portion received by said housing and said body portion engaging said collar.

11. The transmission of claim 1 wherein said housing further includes a plurality of internal grooves connecting said detent recesses.

12. The transmission of claim 11 wherein said detent recesses are arranged along an arc line, and said grooves are also disposed along the arc line, whereby said engaging means is guided from recess to recess by said grooves during movement of said shifting means.

13. The transmission of claim 1 wherein said detent recesses are cast in said housing.

* * * * *